Figure 1:
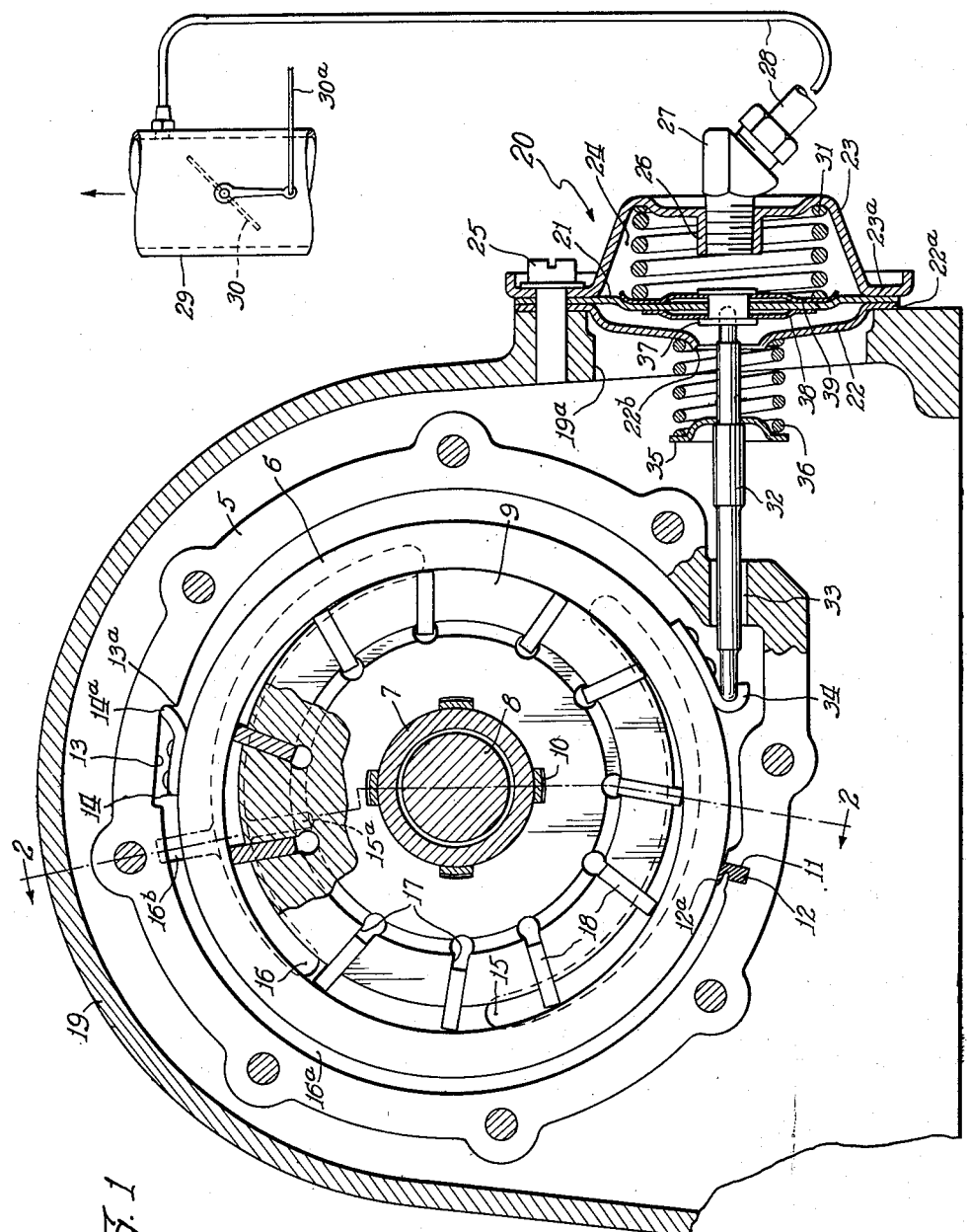

Jan. 25, 1955 R. L. SMIRL 2,700,341
PUMP ARRANGEMENT FOR OPERATING AUTOMATIC CLUTCHES
Filed Dec. 24, 1948 2 Sheets-Sheet 1

Inventor:
Richard L. Smirl

Jan. 25, 1955 R. L. SMIRL 2,700,341
PUMP ARRANGEMENT FOR OPERATING AUTOMATIC CLUTCHES
Filed Dec. 24, 1948 2 Sheets-Sheet 2

Inventor:
Richard L. Smirl

United States Patent Office 2,700,341
Patented Jan. 25, 1955

2,700,341

PUMP ARRANGEMENT FOR OPERATING AUTOMATIC CLUTCHES

Richard L. Smirl, Chicago, Ill., assignor to Borg-Warner Corporation, Chicago, Ill., a corporation of Illinois Application December 24, 1948, Serial No. 67,229

11 Claims. (Cl. 103—120)

The present invention relates to an automatic clutch for transmissions, and has more particular relation to a pump arrangement for controlling the pressure in a hydraulic system for operating such clutch. In the present instance the clutch may be of the friction disc, the band, or other type, and the pump is of a variable displacement character, such displacement being in a direct ratio to and is coordinated with the vacuum or suction in the intake manifold of an internal combustion engine used in motor driven vehicles.

In the present arrangement the stator or shiftable sleeve of the pump is fulcrumed on pivotal means in the outer shell or housing, and there is a seal between the pump chamber and housing at a location which is approximately diametrically opposite to said fulcrum. Thus the pump chamber in effect, constitutes a variable displacement member. Such variable displacement is responsive to a pressure reaction which is transmitted from the vacuum side of the engine manifold to a diaphragm which in turn actuates a strut or piston having a direct connection with the pump sleeve or stator thereby to swing said sleeve on its fulcrum. The pressure developed by the pump is thereby functionally related to the torque being transmitted by the engine.

By reason of the present arrangement it is not necessary to provide means such as valved passages for by-passing excess delivery from the pump back to the suction side thereof when the engine may be running at high speed. Such by-passing of excess fluid pressure is not required for the reason that the pump automatically adjusts its delivery to actual requirements, hence saving considerable power and reducing the amount of generated heat. This frequently is quite critical, especially in transmissions and similar arrangements using synthetic rubber members which tend to age rapidly when subjected to high temperatures. The variable displacement of the pump, which is automatically controlled, is dependent upon torque of the engine in response to the manifold pressure. This is accomplished in a simple manner by shifting a strut or piston which cooperates with the pump sleeve or stator at a location which is to one side of and close to the sealing means or which is diametrically opposite the fulcrum for the pump chamber. This arrangement minimizes the power required to shift the chamber, and also permits the shifter piston or strut to be located for operation in a plane which is tangent to the outer circumference of the sleeve or stator thereby requiring but a small amount of power to operate said piston.

Other novel features and advantages of the invention contemplated herein will be apparent to persons skilled in the art after the construction and operation of the assembly is understood from the within description. It is preferred to accomplish the numerous objects hereof, and to practice the invention, in substantially the manner hereinafter fully described and as more particularly pointed out in the claims. Reference is now made to the accompanying drawings forming a part of this specification.

Figure 2:
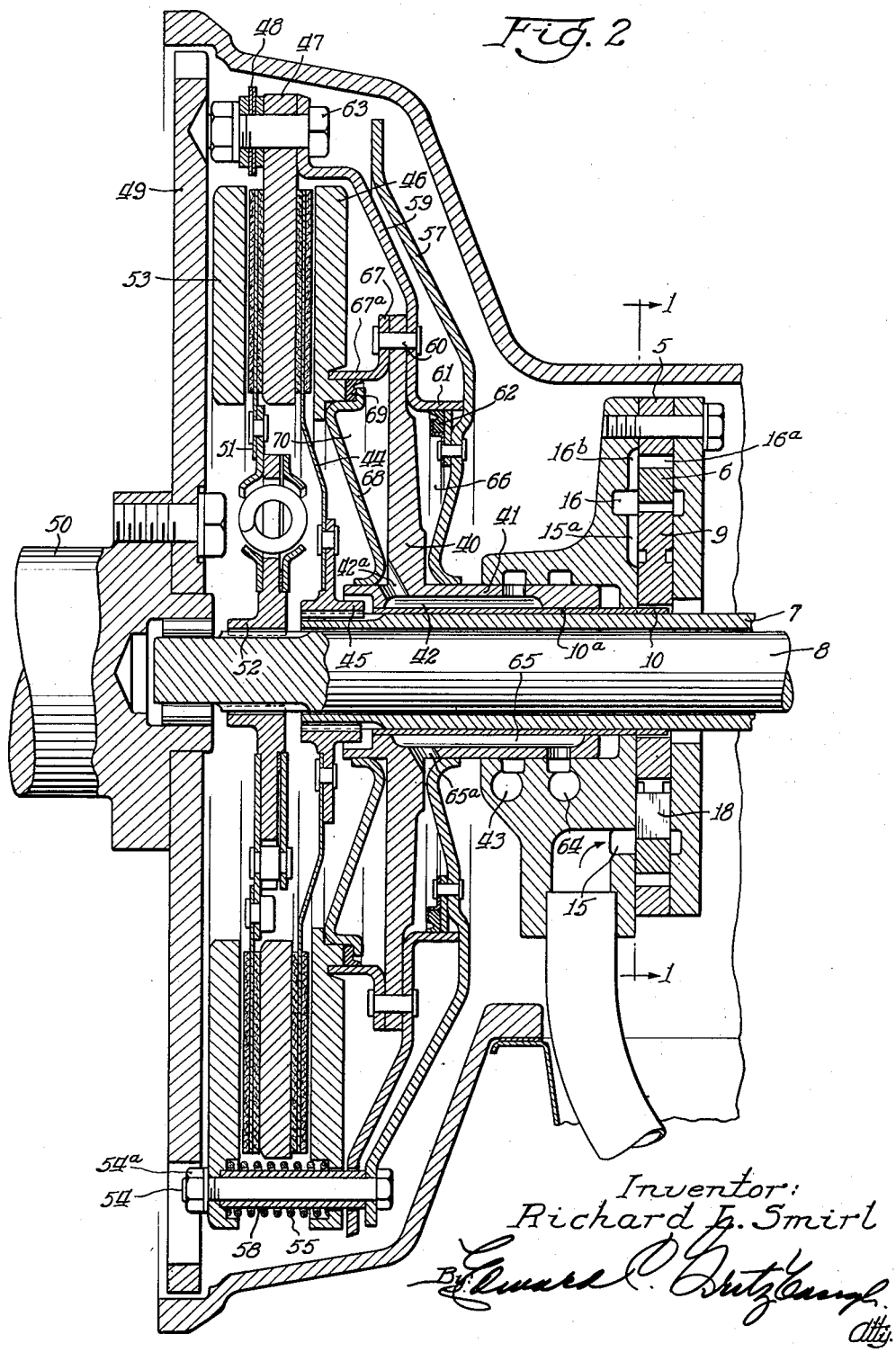

In the drawings:

Fig. 1 is a vertical sectional view of the pump and its control assembly, the view being taken transversely across the axes of the pump and its associated parts, and showing the connection with the engine throttle; and Fig. 2 is an axial section taken along the plane of line 2—2 on Fig. 1, and schematically showing a typical clutch assembly which may be operated by the fluid pressure delivered from the pump arrangement.

The drawings are to be understood as being more or less of a diagrammatic character for the purpose of disclosing a typical or preferred form of the improvements contemplated herein, and in said drawings the same reference characters identify like parts in the different views.

The pump arrangement shown in Fig. 1 comprises a generally cylindrical housing 5 encompassing the stator or pump shell 6, which latter is mounted eccentric to the axes of the telescoped sleeve shaft and solid shaft 7 and 8, respectively. The rotor or pump body 9 is supported on shaft 7 and is drivingly connected, by splines 10, to bushing 10a. Housing 5 has a channel 11 for receiving a seal member 12 formed of suitable flexible or yieldable material, and has a trailing lip or tab portion 12a which bears against the outer surface of the stator or shell 6. The oscillation of the stator for the purpose of effecting variable displacement of the pump, is preferably of a swinging character upon a fixed fulcrum which is located at the side of the housing which is directly opposite the seal 12. For this purpose the inner surface of the housing 5 has a notch or recess 13, one of the ends of which provides a radial abutment or stop 13a which is engaged by the outwardly deflected lip 14a of a clip 14 that is securely attached to the exterior surface of stator 6.

It will be seen by reference to Fig. 1 that the abutment or stop 13a and the proximate portion of the lip 14a are in a radial plane which is approximately diametrically opposite the seal 12. The housing 5 has an inlet or suction port 15, extending circumferentially on each side of the seal 12 and communicates with the suction of the pump through the connecting port 15a. The outlet or discharge port 16 communicates with the pressure side of the pump through connecting port 16b, and it extends circumferentially on each side of the radial plane of the fulcrum clip 14.

A plurality of radially arranged pockets or channels 17 are made in the rotor or pump body 9 and extend inwardly from the outer cylindrical surface thereof to receive the slidable blades or vanes 18, which are adapted to sweep the inner surface of the pump chamber defined by the bore of stator 6 which, as before stated, is eccentric to the shafts 7 and 8 and, of course, is also eccentric to the rotor or pump body 9, thereby causing the blades 18 to be moved inward and outward in their channels during operation of the rotor or body.

The shifting of stator or sleeve 6 to change the degree of eccentricity thereof, and thereby vary the displacement of the pump, is effected through the instrumentalities of the arrangement shown at the right side of Fig. 1. It will be seen that the pump assembly is enclosed within a suitable casing or shield 19 which has a circular aperture 19a in a side wall thereof, which aperture is spanned by a diaphragm chamber assembly identified generally as 20. This assembly 20 preferably comprises a flexible diaphragm 21 the annular margin of which is clamped between the radial lips 22a and 23a of opposing sheet metal cups or plates 22 and 23, the latter cup 23 being deeper than the former for the purpose of providing a pressure chamber 24 on the outer side of diaphragm 21. The rims of the cups or plates 22 and 23 are securely anchored to the margin of opening 19a preferably by screws, bolts, or the like 25, the shanks of which also pass through the margin of the diaphragm and are threaded into holes in casing or shield 19 thereby sealing the pressure chamber 24. The central region of cup 23 has a threaded axial stub 26 to receive a pipe coupling 27 which is connected to a pipe 28 leading from the intake manifold 29 of the internal combustion engine (not shown). This communication with said manifold is beyond the throttle valve 30 in said manifold where the fluid in said pipe is subjected to variations created in the manifold by the manual operation of butterfly valve 30 through the medium of control member 30a. A coiled expansion spring 31 within the pressure chamber 24 urges the diaphragm 21 in a direction inwardly toward the inner cup plate 22 which is open to the atmosphere through its central aperture 22b.

A piston strut 32 passes through a guide hole 33 in the pump housing 5 and is arranged with its inner end engaged with a hook shaped seat member 34 which is anchored to the outer surface of stator or sleeve 6, the arrangement being such that the axis of the piston strut 32 is in a plane which is tangent to the outer surface of the stator or sleeve 6. There is a shoulder 32a on the mid-portion of piston strut 32 against which a washer-like stop 35 abuts, and a coiled limiting spring 36 has one end engaged with this stop and its other end seated on the cup plate 22 in surrounding relation with respect with the aperture 22b therein. As shown in Fig. 1, the outer end of the piston strut 32 is engaged in a recess in a flanged rivet or button 37 carried by the diaphragm 21. The shank of this button passes through said diaphragm, and the head and flange of said button firmly engage the mid-region of a pair of spring washers 38 and 39 arranged on opposite sides of diaphragm 21. This arrangement is such that the adjacent end of spring 31 is seated against the washer 39 near the flared periphery thereof.

The operation of the hereinbefore described assembly is generally as follows: The rotor 9 is revolved by shaft 7, at the speed of such shaft, and it is apparent that when the throttle valve 30 is opened to accelerate engine speed, the manifold pressure increases and this pressure, being transmitted through pipe 28 to pressure chamber 24 will move the diaphragm 21 to the left (Fig. 1) and the displacement of the pump will increase. When the engine is throttled down to a reduced or decelerated speed, as for idling, the valve 30 will partly close as the manifold pressure beyond this valve is reduced, thereby permitting the diaphragm 21 to move to the right, and acting on piston strut 32 will swing the stator 6 to a position where there is reduced displacement of the pump. Since the engine torque varies substantially in direct proportion to the absolute manifold pressure, an arrangement which varies the pump pressure with the manifold pressure will accomplish the result desired. In the present structure this is effected by leading the pressure fluid from the pressure port into the arcuate space or chamber 16a between the seal 12 and the fulcrum 14a where it will tend to force the stator 6 toward the right and thus oppose the manifold pressure which is urging the stator toward the left by means of the piston strut 32 and thereby creating a balance of said pressures.

The fluid pressure generated by this pump arrangement is adapted to be utilized for effecting the operation of clutches mounted on shafts 7 and 8, and which may comprise any of the various types. For the purpose of the present disclosure clutches of the friction disc type have been shown. The elongated hub 41 of the annular carrier 40 tightly fits bushing 10a to rotate on shaft 7, and said hub has a fluid conduit 42 communicating at one end with a passageway 43 in the pump housing leading from the pump discharge port 16. The friction clutch driven disc 44 has its hub 45 splined on shaft 7 adjacent an end of the hub 41 of carrier 40 and has its outer region interposed between an annular pressure plate 46 and a ring 47, the latter being drivingly connected by metal straps 48 to fly-wheel 49 on the engine crank shaft 50. A second friction clutch driven disc 51 has its hub 52 splined on shaft 8 beyond the end of sleeve shaft 7 and is arranged with its outer region between ring 47 and a second pressure plate 53. Pressure plates 46 and 53 have bolts 54 extending through their peripheral regions, which bolts are surrounded by springs 55 the ends of which are engaged in seats in the facing sides of said pressure plates whereby said plates are adapted for axial relative movement and the springs are effective to urge the pressure plates 46 and 53 axially away from each other. A piston 57 comprising a dished metal stamping is slidably mounted on hub 41 between the pump and the carrier 40, and the outer marginal region of said piston receives the bolts 54. Long bushings 58 surround the shanks of bolts 54 with their ends abutting said piston and said second pressure plate 53, so that when said bolts are tightened by their nuts 54a this pressure plate 53 and the piston 57 are firmly held together for axial movement in unison. A sheet metal member 59 is secured to the outer region of carrier 40 by rivets 60 and said member has a cylindrical axial flange 61 extending towards piston 54 so that the seal ring 62 of said piston engages the inner surface of said flange. Bolts 63, which secure the connector straps 48 to the intermediate ring 47, also pass through the outer margin of member 59 to anchor the latter to said ring. Fluid from the pump for operating piston 57 discharges into an annular passageway 64, thence to a conduit 65 and branch 65a in sleeve hub 41 for discharge into the fluid chamber 66 defined by carrier 40, cylindrical flange 61, and inner region of piston 57. The pressure of such fluid in chamber 66 is such that axial movement of piston 57, through the instrumentality of bolts 54, will draw the second pressure plate 53 sufficiently to engage friction clutch disc 51 with the intermediate ring member 47. Thus torque is transmitted from the engine crank shaft 50 to the inner driven shaft 8.

A ring member 67 is secured to the outer region of carrier 40 by rivets 60 and has its cylindrical flange 67a extending axially towards the first pressure plate 46, and a Z-shaped piston 68 has its seal ring 69 slidably engaged with said flange 67a. This seal ring and the adjacent corner and flange of said piston engage the axial inner region of pressure plate 46, while the other or inner flange of the Z-shaped piston slides on the adjacent portion of the carrier hub 41. A branch 42a of conduit 42 discharges pressure fluid from the pump into the chamber 70 which is formed by the carrier 40, ring flange 67a and piston 68, thus moving the first pressure plate 46 sufficiently to engage friction clutch disc 44 with the intermediate ring 47 and drive the sleeve shaft 7 independently of the inner shaft 8.

It is apparent, from the foregoing, that the improvements contemplated herein comprise a pump having a pressure fluid chamber the capacity of which is varied in response to variations in engine torque which latter is responsive to the throttle position, and that the associated chamber assembly is effective to oppose the thrust created in the pump pressure fluid chamber. Further, it will be noted that the spring means, between the associated chamber wall and the piston, is adapted to limit the output of the pump to a predetermined minimum.

While this invention has been described in detail in its present preferred form or embodiment, it will be apparent to persons skilled in the art, after understanding the improvements, that changes and modifications may be made therein without departing from the spirit or scope thereof. It is aimed in the appended claims to cover all such changes and modifications.

What is claimed is:

1. A variable displacement pump arrangement adapted to operate a motor vehicle clutch, comprising a rotatable shaft; a pump housing defining a pump chamber concentrically around said shaft; a cylindrical stator eccentric to said shaft and mounted for bodily oscillation within said housing; means adapted to fulcrum said stator for swinging movement within said housing; a pump rotor of the sliding vane type driven by said shaft for rotation in said stator in spaced relation to the inner surface of said stator; sealing means between said housing and said stator at a location spaced from said fulcrum means; said fulcrum and seal defining the limits of an arcuate chamber between said housing and stator in communication with the pressure side of the pump; and means adapted to modify the eccentric relationship between said stator and rotor comprising a reciprocable piston strut having a connection with a portion of said stator opposite said fulcrum; a fluid chamber outside said housing and having a flexible wall the movement of which is adapted to effect the aforesaid reciprocation of said piston strut; a source of pressure fluid supply; conduit means for transmitting pressure fluid from said source to said fluid chamber; and means at said source adapted to vary the degree of pressure of the fluid transmitted to said fluid chamber; the fluid pressure in said arcuate chamber being effective, during clutch engagement, to overbalance the thrust of said strut and urge said stator to approximately concentric relation to said rotor thereby reducing the displacement of the pump.

2. A variable displacement pump arrangement adapted to operate a motor vehicle clutch, comprising a rotatable shaft; a pump housing defining a pump chamber concentrically around said shaft; a cylindrical stator eccentric to said shaft and mounted for bodily oscillation within said housing; means defining a fulcrum for said stator for swinging movement within said housing; a pump rotor of the sliding vane type driven by said shaft for rotation in said stator in spaced relation to the inner surface of said stator; sealing means between said housing and said stator at a location spaced from said fulcrum; said fulcrum and seal defining the limits of an arcuate chamber between said housing and stator in communication with the pressure side of the pump; and reciprocable thrust means adapted to modify the eccentric relationship between said stator and rotor, said means comprising a pressure fluid chamber of variable capacity exterior to said pump housing and having a flexible wall connected by a strut to said stator; and means for supplying fluid to said exterior chamber at varying degrees of pressure; the fluid pressure in said arcuate chamber being effective, during clutch engagement, to overbalance the thrust of said strut and urge said stator to approximately concentric relation to said rotor thereby reducing the displacement of the pump.

3. A variable displacement pump arrangement adapted to operate a motor vehicle clutch, comprising a rotatable shaft; a pump housing defining a pump chamber concentrically around said shaft; a cylindrical stator eccentric to said shaft and mounted for bodily oscillation within said housing; a fulcrum on the exterior of said stator engaged with an abutment on the interior of said housing; a pump rotor of the sliding vane type driven by said shaft for rotation in said stator in spaced relation to the inner surface of said stator; sealing means between said housing and said stator at a location spaced from said fulcrum; said fulcrum and seal defining the limits of an arcuate chamber between said housing and stator in communication with the pressure side of the pump; and means adapted to modify the eccentric relationship between said stator and rotor, said means comprising a pressure fluid chamber of variable capacity exterior to said pump housing and having a flexible wall connected by a strut to said stator; and means for supplying fluid to said exterior chamber at varying degrees of pressure; the fluid pressure in said arcuate chamber being effective, during clutch engagement, to overbalance the thrust of said strut and urge said stator to approximately concentric relation to said rotor thereby reducing the displacement of the pump.

4. A variable displacement pump arrangement for operating a motor vehicle clutch, comprising a housing having a cylindrical wall; an abutment on the inner surface of said wall; a rotatable shaft journaled axially in said housing; a pump body drivingly supported by said shaft; radially slidable blades carried by said pump body; a sleeve mounted within said housing in eccentrically spaced relation around said body and adapted to be engaged by said blades; a member on the exterior of said sleeve engaged with said abutment, whereby said sleeve is fulcrumed for swinging movement to vary the displacement of said pump; sealing means between said sleeve and housing at a location remote to said fulcrum; said fulcrum and seal defining the limits of an arcuate chamber between said housing and sleeve in communication with the pressure side of the pump; means defining a seat on the outer surface of said sleeve adjacent said seal; a reciprocable strut extending into said housing and operatively engaged with said seat; and means associated with said housing for actuating said strut, said means comprising a diaphragm responsive to fluid pressure from a source of variable pressure other than said pump, whereby the pump pressure is varied in proportion to changes of pressure at said source; the fluid pressure in said arcuate chamber being effective, during clutch engagement, to overbalance the thrust of said strut and urge said sleeve to approximately concentric relation to said rotor thereby reducing the displacement of the pump.

5. A variable displacement pump arrangement adapted to operate a motor vehicle clutch, comprising a rotatable shaft; a pump housing defining a pump chamber around said shaft; a cylindrical stator eccentric to said shaft and mounted for bodily oscillation within said housing; means adapted to fulcrum said stator for swinging movement within said housing; a vaned rotor driven by said shaft for rotation in said stator in spaced relation thereto; extraneously operated actuator means for arcuately moving said stator on said fulcrum means; and a yieldable seal between said housing and stator at a location spaced from said fulcrum means, said fulcrum and seal defining the limits of an arcuate pressure responsive chamber communicating with the pressure side of the pump for exerting pressure against said stator to oscillate the same upon said fulcrum means; the fluid pressure in said arcuate chamber being effective during clutch engagement to overbalance the thrust of said actuator means and urge said stator to approximately concentric relationship to said rotor, thereby reducing the displacement of the pump.

6. A variable displacement pump arrangement adapted to operate a motor vehicle clutch, comprising a housing defining a cylindrical pump chamber; an annular stator positioned within said chamber in eccentrically spaced relation to said housing and adapted for bodily oscillation; fulcrum means exterior to said stator upon which said stator is adapted to swing; a vaned rotor movable in said stator in spaced relation thereto; a seal between said housing and stator carried by one of said members, said seal being spaced circumferentially from said fulcrum means for defining the limits of an arcuate pressure fluid chamber communicating with the pressure side of the pump; and means effective to modify the eccentricity of stator comprising a fluid pressure chamber of variable capacity associated with said pump housing and having a flexible wall with strut means operatively connecting said flexible wall to said stator; means for supplying extraneous fluid to said associated chamber at varying degrees of pressure; and a spring acting on said connecting means in opposition to the pressure in said arcuate chamber for maintaining a predetermined minimum load on said connecting means; the fluid pressure in said arcuate chamber being effective, during clutch engagement, to overbalance the thrust of said strut and urge said stator to approximately concentric relation to said rotor thereby reducing the displacement of the pump.

7. A variable displacement pump for operating a motor vehicle clutch, comprising a rotatable shaft; a cylindrical housing defining a pump chamber having an inner surface coaxial with and surrounding said shaft; a stator having an inner surface defining a cylinder eccentric to said shaft, said stator being bodily oscillatably movable in said housing toward and from said inner surface thereof; means fulcruming said stator on said pump chamber surface for effecting the aforesaid oscillatable movement of said stator; a cylindrical pump rotor driven by said shaft and having a fixed axis coaxial with said shaft for rotation eccentrically in said stator; radially slidable vanes carried by said rotor, each vane sweeping said stator cylindrical surface; sealing means between said housing and stator, said sealing means with said fulcrum defining the limits of an arcuate chamber between said housing and stator in communication with the pressure side of the pump; and means adapted to bodily swing said stator on said fulcrum means for modifying the eccentric relationship between said stator and rotor, said means comprising a reciprocal piston strut having an end engaged with the outer surface of said stator; a source of variable fluid pressure extraneous to said pump housing; a chamber receiving fluid pressure from said source and having a flexible wall movable in response to variations of said extraneous fluid pressure, said flexible wall transmitting force to said strut in accordance with the variable fluid pressure at said source thereby to effect the aforesaid movement of said piston strut to swing said stator on its fulcrum; the fluid pressure in said arcuate chamber being effective, during clutch engagement, to overcome the thrust of said strut and urge stator to a position to reduce the displacement of the pump.

8. A variable displacement pump for operating a motor vehicle clutch, comprising a rotatable shaft; a cylindrical housing defining a pump chamber having an inner surface coaxial with and surrounding said shaft; a ringlike stator having a complete cylindrical inner surface eccentric to said shaft, said stator adapted for bodily oscillation in said housing toward and from said inner surface thereof; means fulcruming said stator on said pump chamber cylindrical surface whereby the aforesaid oscillation of said stator is effected; a cylindrical pump rotor driven by said shaft and having a fixed axis coaxial with said shaft for rotation in said stator; radially slidable vanes carried by said rotor, each vane sweeping said stator cylindrical surface; sealing means between said housing and said stator approximately diametrically opposite said fulcrum means, whereby said fulcrum and seal define the end limits of an arcuately elongate chamber between said housing and stator in communication with the pressure side of the pump; and means adapted to swingingly move said stator on said fulcrum means for modifying the eccentric relationship between said stator and rotor, said means comprising a reciprocal piston strut having an end engaged with the outer surface of said stator adjacent said seal; a fluid chamber having a flexible wall movable in response to variations of pressure fluid extraneous to said pump and adapted to effect the aforesaid reciprocation of said piston strut; a source of pressure fluid supply remote to said housing; conduit means transmitting pressure fluid from said source to said fluid chamber; and means at said source for varying the pressure of the fluid transmitted to said fluid chamber; the fluid pressure in said arcuate chamber being effective, when the clutch is engaged, to overbalance the thrust of said strut and urge said stator into concentric relation to said rotor and reduce the displacement of the pump.

9. A variable displacement pump for operating a clutch, comprising a cylindrical housing; a shaft rotatable axially in said housing; two members surrounding said shaft having continuous cylindrical surfaces confronting each other, said members being arranged eccentrically one within the other in said housing; the outer of said member defining an oscillatory pump stator with a continuous cylindrical inner surface concentric to said shaft and to the inner member; the inner of said members defining a rotor secured to said shaft with its outer surface concentric thereto; a plurality of reciprocal vanes slidably carried by said rotor, each vane having continuous contact with the inner cylindrical surface of the pump stator during rotation of said shaft; means fulcruming said stator on the inner surface of said housing; a seal spaced arcuately from said fulcrum means and extending between said stator and said housing, said seal and fulcrum means defining the limits of an arcuate chamber between said housing and stator in communication with the pressure side of the pump; thrust means acting on said stator and adapted to swing the same on said fulcrum to modify the eccentric relationship between said stator and rotor thereby to vary the capacity of said chamber; and variable power means for moving said thrust means, said power means being operative in response to variations of a fluid pressure source extraneous to said pump; the fluid pressure in said arcuate chamber being effective, when the clutch is engaged, to overbalance said thrust means and urge said stator into concentric relation to said rotor and reduce the displacement of the pump.

10. A variable displacement pump for operating a clutch, comprising a cylindrical housing; a shaft rotatable axially in said housing; two annular members arranged eccentrically one within the other around said shaft; the outer of said members defining a ringlike oscillatory stator eccentric to said shaft and to the inner member; the inner of said members defining a disclike rotor secured to said shaft with its outer surface concentric thereto; a plurality of reciprocal vanes slidably carried by said rotor, each vane having continuous contact with the inner surface of said pump stator during rotation of said shaft; means at the radially outer portion of said stator for fulcruming said stator on the inner surface of said housing; a seal extending between said stator and said housing at a region approximately diametrically opposite said fulcrum; said seal and fulcrum thereby defining the limits of an arcuate chamber between said housing and stator in communication with the pressure side of the pump; a reciprocal thrust rod acting on said stator at a location remote to said fulcrum means, said thrust means being adapted to swing the stator on said fulcrum to modify the eccentric relationship between said stator and rotor thereby to vary the capacity of said chamber; a servo-motor chamber having a yieldable wall acting on said thrust rod; and a source of variable fluid pressure communicating with said servo-motor chamber for moving said yieldable wall; the fluid pressure in said arcuate chamber being effective, upon clutch engagement, to overbalance the thrust of said rod and urge said stator into concentric relation to said rotor and reduce the displacement of the pump.

11. A control arrangement for operating a motor vehicle clutch comprising a cylindrical pump housing; an annular member in said housing arranged eccentrically thereof, said annular member being bodily movable in said housing for varying pump displacement; a pump rotor rotatable in said annular member; said eccentric annular member and housing together defining a variable pressure chamber; pressure responsive means in non-communication with the variable pressure chamber; means supplying an extraneous source of variable pressure to said pressure responsive means; and actuator means operated by said pressure responsive means for bodily moving said annular member, whereby pressure delivered by the pump is varied in response to changes of pressure in said extraneous pressure source.

References Cited in the file of this patent

UNITED STATES PATENTS

| | | |
|---|---|---|
| 2,031,749 | Vincent | Feb. 25, 1936 |
| 2,142,275 | Lane | Jan. 3, 1939 |
| 2,212,740 | Lavelli | Aug. 27, 1940 |
| 2,296,876 | Samiran | Sept. 29, 1942 |
| 2,309,148 | Wilson et al. | Jan. 26, 1943 |
| 2,318,337 | Schlosser | May 4, 1943 |
| 2,333,075 | Roe | Oct. 26, 1943 |
| 2,409,975 | Curtis | Oct. 22, 1946 |
| 2,433,484 | Roth | Dec. 20, 1947 |
| 2,451,279 | DeLancey | Oct. 12, 1948 |
| 2,451,666 | DeLancey | Oct. 19, 1948 |
| 2,493,525 | Bush | Jan. 3, 1950 |
| 2,528,585 | Farkas et al. | Nov. 7, 1950 |

FOREIGN PATENTS

| | | |
|---|---|---|
| 421,868 | Great Britain | Jan. 1, 1935 |